No. 620,046. Patented Feb. 21, 1899.
J. U. G. MORRISON & A. A. KREGNES.
CULTIVATOR.
(Application filed Oct. 4, 1898.)
(No Model.)
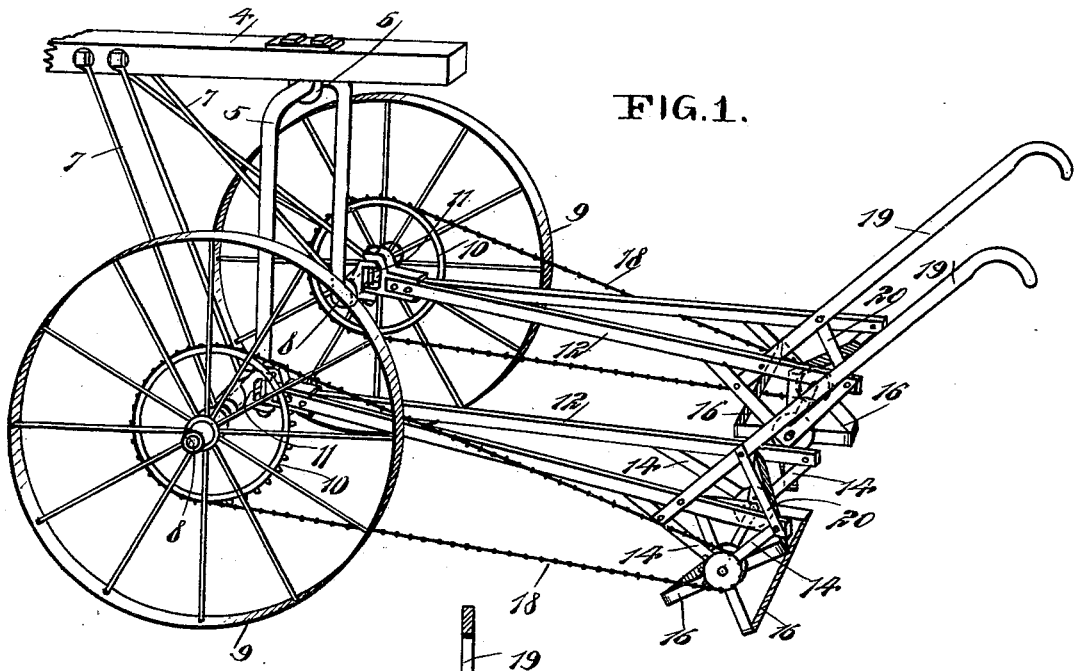
FIG. 1.
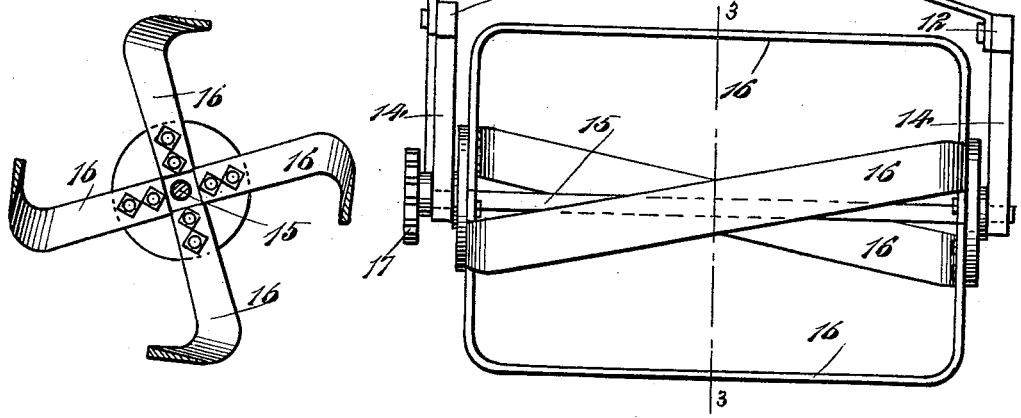
FIG. 3.
FIG. 2.
WITNESSES:
Donn Twitchell
Bras B. Rivers
INVENTORS
John U. G. Morrison
Andrew A. Kregnes
BY
ATTORNEYS.

UNITED STATES PATENT OFFICE.

JOHN U. G. MORRISON AND ANDREW A. KREGNES, OF HOOKER, SOUTH DAKOTA.

CULTIVATOR.

SPECIFICATION forming part of Letters Patent No. 620,046, dated February 21, 1899.

Application filed October 4, 1898. Serial No. 692,589. (No model.)

*To all whom it may concern:*

Be it known that we, JOHN U. G. MORRISON and ANDREW A. KREGNES, of Hooker, in the county of Turner and State of South Dakota, have invented a new and Improved Cultivator, of which the following is a full, clear, and exact description.

This invention relates to a cultivator designed particularly for cultivating corn-land; and the cultivator is characterized, broadly, by one or more revolving blade-cylinders, the cutting edges of which move in the plane of the surface of the ground and pass slightly below the surface, so as to sever the roots of the weeds.

This specification is the disclosure of one form of our invention, while the claim defines the actual scope thereof.

Reference is to be had to the accompanying drawings, forming a part of this specification, in which similar characters of reference indicate corresponding parts in all the figures.

Figure 1 is a perspective view of the invention. Fig. 2 is an enlarged front view of one of the blade-cylinders, and Fig. 3 is a cross-sectional view thereof on the line 3 3 in Fig. 2.

The cultivator has a sulky-frame comprising a beam 4, to which an arched axle 5 is fastened by a U-bolt 6. This axle is braced by bars 7 extending between the spindles 8 of the axle and the beam 4. Mounted on each spindle 8 is a wheel 9, and attached to each wheel, so as to turn therewith, is a sprocket-wheel 10.

Each spindle 8 carries a vertical pin 11, on which are respectively mounted the cultivator-frames 12, which swing sidewise on vertical pillars formed by said pins 11. Each frame 12 consists in two divergent bars, and each bar is provided with two downwardly-extending rigid braces 14, such braces carrying in each frame the axle 15 of the U-shaped cultivator-blades 16, such blades forming the blade-cylinder referred to hereinbefore. The blades 16 are arranged diagonally with reference to the shaft 15, so as to effect a shear cut during the action of the blades. Each shaft 15 carries a sprocket-wheel 17. Over these sprocket-wheels 17 chains 18 respectively pass, such chains also respectively passing over the wheels 10 and being driven thereby. Each frame 12 has a handle 19 attached thereto and stayed by braces 20 attached to the frames 12 and to the handles.

In using the invention the sulky is drawn over the ground and the movement of the wheels 9 will serve to turn the blade-cylinders. The cultivator-frames are guided by the handles 19, and owing to the pivotal mounting of the frames the blades may be caused to act in the desired manner upon the ground.

Having thus fully described our invention, we claim as new and desire to secure by Letters Patent—

In a cultivator, the combination of a sulky-frame, comprising a beam and an arched axle fastened thereto carrying-wheels mounted on the axle, sprocket-wheels respectively driven by the carrying-wheels, a cultivator-frame pivotally mounted at each end of the axle, the cultivator-frames being movable laterally toward and from each other, a shaft revolubly mounted in the rear portion of each cultivator-frame, a series of U-shaped cultivator-blades attached respectively to the shafts and turning therewith to work the ground, a sprocket-wheel attached to each shaft, sprocket-chains running between the first and second named sprocket-wheels to drive the latter, and handles respectively in connection with the cultivator-frames.

JOHN U. G. MORRISON.
ANDREW A. KREGNES.

Witnesses:
HARRY KUNKLE,
J. G. KUNKLE.